Aug. 30, 1949.　　　　　W. L. RIPLEY　　　　　2,480,509
VEHICLE SUPPORTED TENT

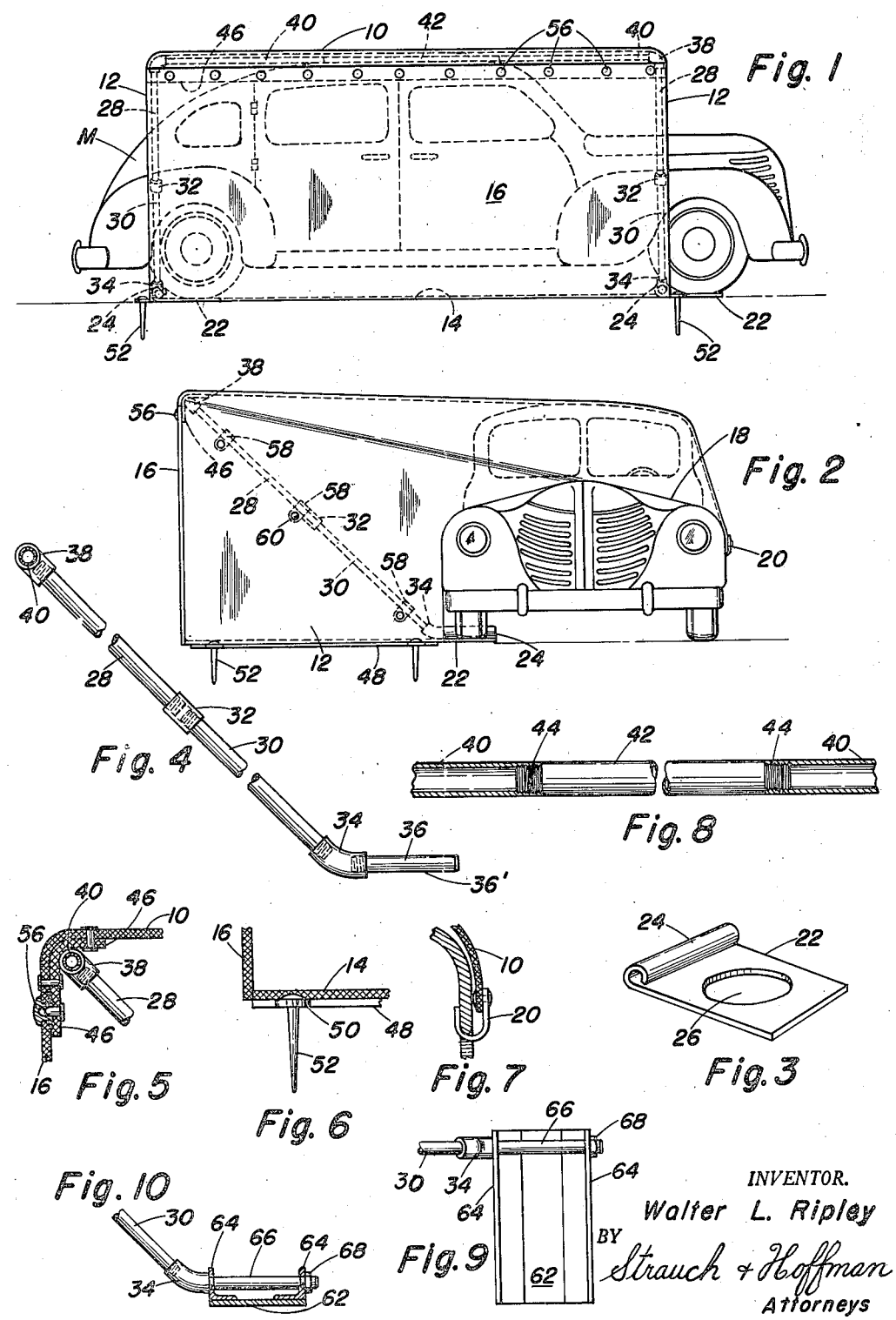

Filed Oct. 2, 1947　　　　　　　　　　　　　2 Sheets-Sheet 2

INVENTOR.
Walter L. Ripley
BY
Strauch + Hoffman
Attorneys

Patented Aug. 30, 1949

2,480,509

UNITED STATES PATENT OFFICE 2,480,509

VEHICLE SUPPORTED TENT

Walter L. Ripley, Yankeetown, Fla.

Application October 2, 1947, Serial No. 777,421

25 Claims. (Cl. 135—3)

1

This invention relates to vehicle supported tents and has for its general object and purpose to provide a tent of this type in which the several parts thereof can be easily and quickly assembled and arranged in attached supported relation to a motor vehicle, or motor vehicle trailer, to provide a sleeping compartment of ample dimensions at one side of the vehicle body.

Another object of the invention resides in the provision of a tent having top and end walls designed to extend over the vehicle body at one of their ends and having means for attachment to fixed parts of the vehicle at one side thereof, and an auxiliary supporting frame for said walls extending laterally from the opposite side of the vehicle, together with means for utilizing the weight of the vehicle to rigidly retain said frame in fixed relation to the vehicle body.

It is a more particular object of the invention to provide anchor plates of novel construction, adapted to be disposed beneath front and rear wheels of the vehicle and with which the auxiliary tent supporting frame is detachably connected.

In a preferred embodiment of the invention the supporting frame comprises similar portions with means for adjustably connecting the same with the respective anchor plates to extend diagonally upward therefrom exteriorly of opposite ends of the tent, with means for supporting the top wall of the tent between the upper ends of said frame portions under resilient tensional stress.

An additional object of the invention resides in the provision of a floor section for the tent of flexible material with means for securely anchoring the same to the ground, and a front wall section which can be readily detached and removed for daytime use of the tent.

It is also an object of my invention to provide a tent structure as above characterized of comparatively low production cost and in which said auxiliary supporting frame comprises a plurality of detachably coupled sections so that said frame parts together with the flexible tent walls, when not in use, can be very compactly arranged in a minimum of space in the storage compartment of the vehicle.

With the above and other objects in view, the invention comprises a vehicle supported tent and the construction and arrangement of its several parts, as will be hereinafter more fully described, illustrated in the accompanying drawings and subsequently incorporated in the subjoined claims.

In the drawings wherein I have disclosed several simple and practical embodiments of the invention, and in which similar reference characters designate corresponding parts throughout the several views.

Figure 1 is a side elevation of one embodiment showing the several parts of my improved tent in assembled relation with a motor vehicle.

Figure 2 is a front end elevation thereof.

Figure 3 is a perspective view of one of the anchoring plates for the tent supporting frame.

Figure 4 is a vertical section through the horizontal portion of the frame illustrating the detachably coupled end sections thereof.

Figure 5 is a fragmentary vertical section on an enlarged scale showing the reenforcing means for the front end edge of the flexible top wall of the tent engaged with the supporting frame and the upper edge of the front wall detachably connected therewith.

Figure 6 is a similar vertical sectional view through the floor section of the tent.

Figure 7 is a fragmentary vertical section showing the means for attaching one end of the top and end walls of the tent to the fenders of the motor vehicle.

Figure 8 is a detail fragmentary elevation partly in section illustrating the coupling means between the horizontal sections of the supporting frame.

Figures 9 and 10 are detail plan and sectional views respectively showing a modified form of anchor plate and means for connecting the frame thereto.

Figure 11:
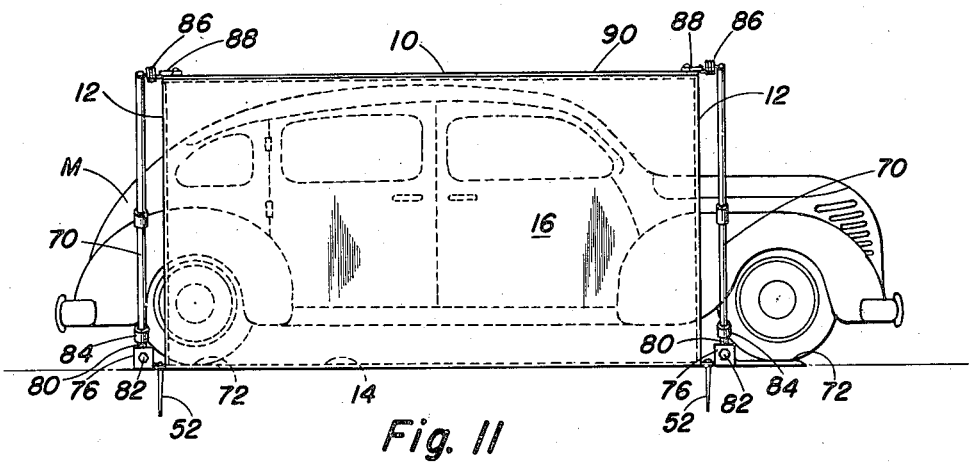
Figure 11 is a side elevation similar to Figure 1, illustrating a simplified and preferable form of the invention.
Figure 14:
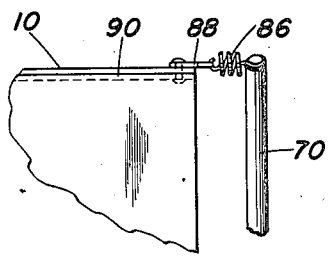
Figure 14 is a fragmentary elevation showing the means for resiliently connecting the frame members at their upper ends to the tent.
Figure 12:
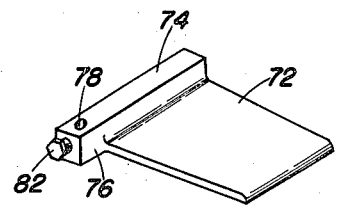
Figure 12 is a perspective view of the anchor plate for the latter embodiment of the invention.
Figure 13:
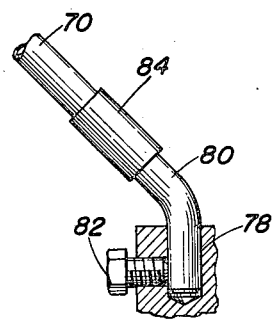
Figure 13 is a detail sectional view showing the means for adjustably connecting the frame members to the anchor plates.

For purposes of illustration, in the drawing I have shown my improved tent as applied to a motor vehicle of well known design. However, it will become apparent from the following description that, with minor changes in dimensions and design, my novel tent structure may also be used in connection with motor vehicles of various other types, as well as with non-powered vehicles, such as a motor vehicle trailer, to provide supplemental sleeping quarters.

Referring in further detail to the drawing, in the example illustrated in Figures 1 to 8 thereof, the flexible tent structure includes a top wall 10, opposite end walls 12, a floor section 14 and a front wall section 16. Each of these sections is cut to proper dimensions from water proof canvas or other equally durable flexible material. The end wall sections 12 are seamed to the opposite side edges of the top wall 10, and the lower edges of said end wall sections at one of their ends are suitably cut or fashioned, as indicated at 18 to extend across and in contact with the engine hood and the rear end of the vehicle body respectively, while the corresponding portion of the top wall 10 extends over and in contact with the top surface of the vehicle body. This end portion of the top wall of the tent is then extended downwardly from the roof of the vehicle upon one side thereof and is provided with hooks or equivalent devices, indicated at 20, which are adapted to be engaged under the lower edges of the front and rear vehicle wheel fenders substantially at the top center portion thereof.

The top and end walls 10 and 12 respectively are of sufficient length to extend laterally from the opposite side of the vehicle for a distance which is substantially equal to the vehicle width, and these latter portions of the tent walls are sustained and supported in proper angular relation to each other by an auxiliary frame structure held in rigidly fixed position by the weight of the vehicle as will now be described.

The anchoring means for the auxiliary tent supporting frame comprises two elongated rectangular plates 22, each of which, as shown in Figure 3, has one of its ends turned inwardly on one side of the plate to form a cylindrical sleeve 24. Each plate 22 is further provided with a large diameter opening 26. These plates are adapted to be arranged upon the ground or road surface closely adjacent to the point of contact of the front and rear wheel tires of the vehicle, with the sleeved ends 24 of said plates spaced rearwardly from the tires. The vehicle is then backed upon the plates 22 to contact the tires with the sleeves 24, the tread projections of the tires entering the openings 26 of the respective plates. Under the weight of the vehicle these plates 22 will be securely anchored to the ground or road surface against any displacement relative to the vehicle wheels. It will be noted that the sleeves 24 of the anchor plates are thus located slightly to the rear of vertical planes passing through the axial center of the respective vehicle wheels.

The frame structure comprises opposite end portions and a horizontal connecting portion, each of which preferably includes a plurality of sections of aluminum piping or other light weight tubular metal of equal rigidity. As seen in Figure 4 of the drawing, each end portion of the frame consists of two sections 28 and 30 respectively having conventional detachably threaded coupling means at mating ends thereof as indicated at 32. Each section 30 at its other end is threaded in one end of 45° elbow joint member 34 to which a short length of pipe 36 is connected for insertion into the sleeve 24 on one of the anchor plates 22. The lower surface of the pipe section 36 may be flattened as at 36' to contact the top surface of plate 22 and limit turning or rocking motion of said pipe 36 within the sleeve 24.

The other end of each section 28 of the frame has a 90° elbow member 38 threaded thereon to receive one of the sections 40 of the horizontal portion of the frame extending at right angles to the end portion thereof. These sections 40 of the frame are connected by the intermediate coupling section 42, the opposite ends 44 of which have reversely threaded connections with said sections 40. Thus when the parts 40 and 42 of the frame are connected in assembled relation, the end portions of the frame are drawn inwardly toward each other and maintained rigidly in vertical planes substantially normal to the anchor plates 22 and extending outwardly and upwardly from said plates at an angle of approximately 45°.

After the auxiliary frame structure is assembled and connected to the anchor plates 22 as above described, the top and end wall sections 10 and 12 of the tent, having been removed from the storage compartment of the vehicle in folded condition, are placed upon the top of the vehicle body. These wall sections are then unfolded and extended laterally from one side of the vehicle over the auxiliary frame structure and also outwardly and downwardly over the opposite side of the vehicle and the hooks 20 attached to the front and rear wheel fenders. To the underside of the top wall 10 of the tent along the front edge thereof an angular reinforcing strip 46 of leather or other similar material is secured. The top wall 10 is then tautly stretched so as to engage this reinforcing strip over the horizontal sections 40 and 42 of the auxiliary frame structure while the end walls 12 of the tent extend downwardly from the top wall 10 thereof to the ground externally of the opposite end portions of the frame. Thus, as will be seen from Figure 1 of the drawing, the tent has a lengthwise dimension which is substantially equal to the wheel base length of the vehicle.

The floor section 14 may now be laid in position. Preferably a cleat 48 is secured along each end of this floor section and at its opposite ends has perforated ears or lugs 50 secured thereto through which suitable anchoring pins indicated at 52 in Figure 6, are driven into the ground.

The front end edges of the end walls 12 of the tent and the opposite end edges of the front wall 16 are provided with complementary fastener elements of suitable type as indicated at 54, and similar complementary fastening elements are also provided upon the depending vertical edge portion of the reinforcing strip 46 on the top wall 10 and the upper edge of the front wall 16, as shown at 56. The improved tent will provide a large area completely enclosed at one side of the vehicle which may be conveniently used for living and sleeping purposes. It will be noted that the doors D of the motor vehicle M open into the tent so that the interior of the vehicle can be utilized as a dressing room. If desired a number of straps 58 may be attached at one of their ends to the inner sides of the end walls 12 of the tent to be folded over the end sections 28 and 30 of the frame structure and attached to said walls at their other ends by suitable fasteners, indicated at 60. It will also be noted that the top and end walls of the tent completely cover or obstruct vision through any of the windows or the wind shield of the car, thus affording complete privacy.

For daytime use of the tent the front wall 16, thereof may be readily detached and completely removed, or it may remain connected at its upper edge by the fasteners 56 and simply be folded over upon the top wall 10 of the tent.

In Figures 9 and 10 of the drawings a slightly modified form of the anchor plate is shown. This plate 62 is provided with upstanding longitudinal flanges 64 along its opposite side edges between which the wheel tire is received. These flanges may be welded to the plate or integrally formed therewith and at their corresponding ends are provided with aligned openings to receive the rod 66 connected at one end with the frame joint member 34. The other end of said rod is threaded to receive the nut 68 having clamping engagement with one of the flanges 64 to rigidly retain the frame in connected relation with the anchor plate.

Figures 11 to 15 of the drawings illustrate a simplified embodiment of the invention in which the supporting structure for the flexible tent walls comprises separate end members 70 each of which may include detachably coupled sections as above described. The anchor plates 72 are in the form of metal castings each having a transversely extending rectangular enlargement 74 formed on one end thereof. One end 76 of this enlargement projects beyond the outer side edge of the anchor plate at the rear side of the vehicle wheel as shown in Figure 11. This projecting end of the enlargement is provided with a vertically extending cylindrical bore or socket 78 to receive one end portion of an elbow member 80 which may be rotatively adjusted in said socket and rigidly secured in adjusted position by means of a set screw 82 threaded in the end 76 of enlargement 74.

The other end portion of member 80 is disposed at an angle of substantially 45° and adapted to be detachably coupled to the lower end of the supporting member 70 by a conventional coupling sleeve 84.

Figure 15:
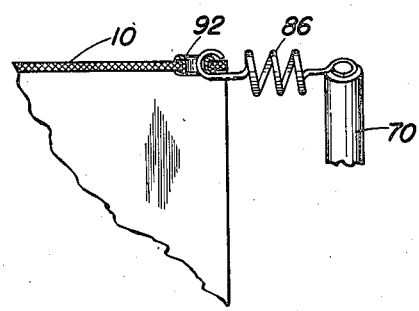
Figure 15 is a detail view of a modification of said connecting means.

Each supporting member 70 at its upper end has one end of a coil spring 86 securely attached thereto. This spring at its other end terminates in a hook for detachable connection with a metal eye or loop 88 riveted or otherwise securely attached to the tent at the longitudinal seam 90 joining the top wall 10 of the tent to the front wall 16 thereof. However, if desired, a conventional metal grommet 92 may be used for this purpose in lieu of the loop 88 as shown in Figure 15.

It will be apparent from the above description that, after the vehicle wheels are positioned on the anchor plates 72, the supporting members 70 may be readily connected therewith and adjusted by rotating the members 80 in the sockets 78 and rigidly locking said members in fixed position by the screws 82. In this manner the upper ends of the supporting members 70 may be properly spaced apart in accordance with the wheel base length of a particular vehicle so that when the springs 86 are connected with the top wall of the tent said wall will be adequately supported under tensional stress in a horizontal plane. Also these springs provide yieldable connections between the tent and the supporting members so that the flexible walls of the tent will not be torn under excessive pressures.

In this embodiment of the invention it will be noted that the supporting members 70 are located externally of the end walls of the tent. The top wall of the tent is attached to the opposite side of the vehicle by means similar to that above described and it will be understood that hooks 20 or other attaching elements may be connected with the flexible tent wall by suitable springs or other adjustable means.

From the above description it will be seen that I have devised a novel tent construction provided with means for easily and quickly attaching the top wall and end walls of the tent to one side of the vehicle body in supported relation therewith while the weight of the vehicle is utilized for rigidly sustaining the auxiliary frame supporting the major portion of the tent walls at the opposite side of the vehicle to provide a completely enclosed commodious sleeping space.

When use of the tent is no longer required, the top and end walls thereof may be readily detached from the vehicle body and the auxiliary supporting frame. They can then be tightly folded, and together with the disassembled frame sections, the anchor plates 22 and the rolled floor section 14 and front wall 16 closely packed into a minimum of space within the storage compartment of the vehicle. It will further be noted that the several parts of my invention are of exceedingly simple structural form so that the manufacturing cost thereof will be reasonably low.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tent for attachment to a vehicle, comprising top and end walls of flexible material having means detachably engageable with fixed parts at one side of the vehicle, said walls adapted to be extended over the vehicle and laterally beyond the opposite side thereof, supporting structure for the latter portions of said tent walls, and means adapted to be interposed between the vehicle and ground surface and connected with said supporting structure, to rigidly anchor said structure by the weight of the vehicle in fixed position relative to the vehicle and the tent walls.

2. A tent attachment for vehicles as defined in claim 1, wherein said anchoring means comprises individual anchor plates upon which front and rear wheel tires respectively of the vehicle are adapted to be positioned, and means for detachably connecting said supporting structure to one end of each of said plates.

3. A tent attachment for vehicles as defined in claim 2, in which each anchor plate is provided with an opening to receive parts of the tire tread.

4. A tent attachment for motor vehicles comprising top and end walls of flexible material, means for detachably connecting said walls at one end to fixed parts of the vehicle at one side thereof, an auxiliary supporting frame and means for anchoring said frame at the ground surface at the opposite side of the vehicle to extend diagonally outwardly and upwardly therefrom, said top and end walls adapted to extend across the vehicle and laterally beyond the latter side thereof to enclose said frame with the upper end of said frame in supporting contact with said top wall at its other end to hold the same under tension and in contact with the roof of the vehicle body, and one of said end walls of the tent being supported by said frame in forwardly spaced relation from the vehicle windshield and said wall having a lower edge portion fashioned to extend across and in contact with the engine hood of the vehicle.

5. A tent attachment for motor vehicles as defined in claim 4, wherein said anchoring means comprises members adapted to be respectively disposed beneath front and rear wheels of the vehicle and held in fixed position by the weight thereof, together with means for detachably connecting opposite end portions of said auxiliary frame with said members, with said frame portions disposed in parallel vertical planes rearwardly of the respective wheel axles.

6. A tent attachment for motor vehicles as defined in claim 4, wherein said auxiliary frame includes opposite end and horizontal portions each comprising a plurality of detachably coupled sections, together with means for detachably connecting said end portions of the frame with said anchoring means.

7. A tent attachment for vehicles as defined in claim 1, wherein said supporting structure includes opposite end portions extending upwardly and outwardly from said anchoring means at an angle of substantially 45° and a horizontal connecting portion between said end portions having supporting contact with said top wall of the tent at the front end edge thereof.

8. A tent attachment for motor vehicles as defined in claim 4, together with a flexible front wall, and means for removably attaching said front wall to the front end edges of said top and end walls.

9. A tent attachment for motor vehicles as defined in claim 8, and a flexible floor section for the tent provided with means for anchoring said floor section to the ground.

10. A tent attachment for vehicles as defined in claim 1 wherein said tent supporting structure includes members located externally of opposite ends of the tent and extending outwardly and upwardly from said anchoring means at an angle of substantially 45°, together with yieldable means connecting each of said members at its upper end with the tent and supporting the top wall thereof under tensional stress in a substantially horizontal plane.

11. A tent attachment for vehicles as defined in claim 10 wherein the connecting means between said members and said anchoring means comprises elements rigidly connected with the respective members and mounted on said anchoring means for rotation about vertical axes to dispose the upper ends of said members in predetermined laterally spaced relation from the ends of the tent and to regulate the tensional pull of said yieldable connecting means, together with means for rigidly securing said elements and supporting members in adjusted position relative to the anchoring means.

12. A tent attachment for vehicles as defined in claim 11 wherein said anchoring means comprises individual anchoring plates for the respective supporting members upon which front and rear wheel tires respectively of the vehicle are adapted to be positioned, each of said plates at one end having means for adjustably mounting the connecting elements for said members thereon.

13. An auxiliary supporting structure for the flexible walls of a tent, said walls having means for attachment to one side of a vehicle, said structure comprising opposite end members, means for anchoring said structure in rigidly fixed position at one side of the vehicle with said end members extending outwardly and upwardly therefrom at an angle of substantially 45°, said anchoring means comprising anchor plates each having means for connection with one end member, said plates adapted to be disposed beneath front and rear wheels of the vehicle and immovably anchored to the ground surface by the weight of the vehicle.

14. The combination defined in claim 13, wherein each anchor plate is formed with a sleeve at one end, and each end member of the supporting structure is provided with a terminal extension for detachable engagement in the sleeve of the respective anchor plates.

15. The combination defined in claim 14, in which each anchor plate is further provided with an opening to receive tread portions of the respective vehicle wheels.

16. Means for supporting the flexible walls of a tent at one side of a vehicle comprising anchor plates adapted to be interposed between front and rear wheels of a vehicle and the ground surface and rigidly held against displacement by the weight of the vehicle, tent supporting members, means for mounting said members on one end of the respective anchor plates in upwardly and outwardly extending relation therefrom and including means for adjusting said members relative to the respective anchor plates to dispose the upper ends of said members in predetermined spaced apart relation, and resiliently yieldable means attached to the latter ends of said members adapted for detachable connection with opposite ends of a tent extending from the side of the vehicle between said members.

17. Supporting structure for a tent attachable to a vehicle to extend from one side thereof, said structure comprising an anchor plate adapted to be interposed between one of the vehicle wheels at said side thereof and the ground surface, a tent supporting member, means on one end of said member and one end of said anchor plate coacting to position said member at an outwardly and upwardly extending angle of substantially 45° from said plate and for rockable adjustment about a vertical axis to position the upper end of said supporting member in predetermined laterally spaced relation to the vehicle wheel axis, and means for rigidly locking said member in fixed adjusted relation to said anchor plate.

18. Tent supporting structure as defined in claim 17 together with a coil spring attached at one end to the upper end of said supporting member and having means at its other end for detachable connection to one end of the tent.

19. Means for anchoring a tent supporting structure to the ground at one side of a vehicle, comprising an anchor plate adapted to be disposed beneath a vehicle wheel and immovably held against displacement by the weight of the vehicle, said plate being provided with means at one of its ends for detachably connecting a part of the supporting structure therewith.

20. The anchoring means defined in claim 19 wherein said plate is provided with an opening to receive a part of a wheel tire tread and said connecting means comprises a sleeve integrally formed with said plate and adapted to receive a terminal extension of the supporting structure.

21. Means for adjustably anchoring a tent supporting member to the ground at one side of a vehicle, comprising an anchor plate adapted to be disposed beneath a vehicle wheel and immovably held against displacement by the weight of the vehicle, said plate at one of its ends having means to support a terminal extension of said member for rotative movement about a vertical axis, and means carried by said plate to rigidly secure said terminal extension in its rotatively adjusted position relative to said plate.

22. The anchor plate for a tent supporting member as defined in claim 21 in which the supporting means for the terminal extension of said member comprises a rectangular enlargement on one end of said anchor plate extending transversely thereof and beyond one side edge of said plate, the latter portion of said enlargement having a vertically disposed socket to receive said terminal extension of said member, and wherein said securing means comprises a set screw threaded in said end portion of said enlargement.

23. A tent frame for supporting a tent at the side of a road vehicle comprising a pair of anchor plates adapted to be disposed beneath and immovably held against displacement by the wheel tires of the vehicle and having a transversely extending opening therein; end frame members, one for each plate, of tubular form having lower end portions disposed at an angle of 45° to the main body portion and removably associated with said transverse plate openings to provide spaced upwardly and outwardly extending end frame members and a cross bar removably interconnecting the upper ends of said end frame members.

24. The combination defined in claim 23 wherein said end frame members and said cross bar are formed from a plurality of separable short sections adapted for ready storage in a vehicle storage compartment.

25. The combination defined in claim 23 wherein the cross bar is composed of end sections and at least one intermediate section having oppositely threaded ends adapted to cooperate with the adjacent matingly threaded ends of said end sections whereby said center section may be threadedly connected to both of said end sections by rotation in a single direction and will draw the other ends of said end sections toward each other to dispose said end members in substantial parallelism.

WALTER L. RIPLEY.

No references cited.